United States Patent
Shahar et al.

(10) Patent No.: US 7,359,434 B2
(45) Date of Patent: Apr. 15, 2008

(54) PROGRAMMABLE PHY FOR BROADBAND WIRELESS ACCESS SYSTEMS

(75) Inventors: Menashe Shahar, Ramat-Gan (IL); Amnon Jonas, Jerusalem (IL)

(73) Assignee: VYYO Ltd., Ben Gurion Airport (IL)

(*) Notice: Subject to any disclaimer, the term of this patent is extended or adjusted under 35 U.S.C. 154(b) by 1096 days.

(21) Appl. No.: 09/771,328

(22) Filed: Jan. 26, 2001

(65) Prior Publication Data

US 2002/0115421 A1    Aug. 22, 2002

Related U.S. Application Data (60) Provisional application No. 60/178,156, filed on Jan. 26, 2000, provisional application No. 60/178,138, filed on Jan. 26, 2000, provisional application No. 60/178,303, filed on Jan. 26, 2000.

(51) Int. Cl.
- *H04B 1/38* (2006.01)
- *H04L 27/00* (2006.01)
- *H04L 3/16* (2006.01)

(52) U.S. Cl. .................. 375/222; 375/259; 370/431; 370/468

(58) Field of Classification Search ............ 375/219, 375/220, 222, 259, 377; 455/3.01, 3.03, 455/419, 420, 63.1, 67.11, 88; 370/225–228, 370/241–245, 252–253, 338, 431, 465, 468
See application file for complete search history.

(56) References Cited

U.S. PATENT DOCUMENTS

| | | |
|---|---|---|
| 4,010,465 A | 3/1977 | Dodington et al. |
| 4,099,121 A | 7/1978 | Fang |
| 4,385,384 A | 5/1983 | Rosbury et al. |
| 5,052,024 A | 9/1991 | Moran, III et al. |
| 5,272,700 A | 12/1993 | Hansen et al. |
| 5,311,550 A | 5/1994 | Fouche et al. |
| 5,377,035 A | 12/1994 | Wang et al. |
| 5,408,349 A | 4/1995 | Tsushima et al. |
| 5,471,645 A | 11/1995 | Felix |
| 5,481,542 A | 1/1996 | Logston et al. |
| 5,481,561 A | 1/1996 | Fang |

(Continued)

FOREIGN PATENT DOCUMENTS

CA    2187141    4/1998

(Continued)

OTHER PUBLICATIONS

Golestani, S. (1995) "Network Delay Analysis of a Class of Fair Queueing Algorithms", *IEEE Journal on Selected Areas in Communication* 13(6):1057-1070.

(Continued)

*Primary Examiner*—Young T. Tse
(74) *Attorney, Agent, or Firm*—Pearl Cohen Zedek Latzer, LLP (57) ABSTRACT

A system and method for communication between a wireless modem and wireless hub on a selected downstream channel of a plurality of downstream channels is provided. The selected downstream channel is selected by the wireless modem after receiving communication parameters for each of the downstream channels and selecting the selected downstream channel by determining the most efficient of the downstream channels at that time for downstream communication.

8 Claims, 8 Drawing Sheets

U.S. PATENT DOCUMENTS

| | | | |
|---|---|---|---|
| 5,487,099 | A | 1/1996 | Maekawa |
| 5,510,859 | A | 4/1996 | Douglass et al. |
| 5,557,612 | A | 9/1996 | Bingham |
| 5,590,409 | A | 12/1996 | Sawahashi et al. |
| 5,596,604 | A | 1/1997 | Cioffi et al. |
| 5,606,664 | A | 2/1997 | Brown et al. |
| 5,625,874 | A | 4/1997 | Uchida et al. |
| 5,634,206 | A | 5/1997 | Reed et al. |
| 5,666,646 | A | 9/1997 | McCollum et al. |
| 5,724,385 | A | 3/1998 | Levin et al. |
| 5,734,589 | A | 3/1998 | Kostreski et al. |
| 5,740,525 | A | 4/1998 | Spears |
| 5,752,161 | A | 5/1998 | Jantti et al. |
| 5,796,783 | A | 8/1998 | Crawford |
| 5,809,090 | A | 9/1998 | Buternowsky et al. |
| 5,809,406 | A | 9/1998 | Taki et al. |
| 5,809,427 | A | 9/1998 | Perreault et al. |
| 5,818,825 | A | 10/1998 | Corrigan et al. |
| 5,831,690 | A | 11/1998 | Lyons et al. |
| 5,862,451 | A | 1/1999 | Grau et al. |
| 5,867,528 | A | 2/1999 | Verbueken |
| 5,896,414 | A | 4/1999 | Meyer et al. |
| 5,903,558 | A | 5/1999 | Jones et al. |
| 5,909,384 | A | 6/1999 | Tal et al. |
| 5,937,005 | A | 8/1999 | Obuchi et al. |
| 5,940,743 | A | 8/1999 | Sunay et al. |
| 5,963,843 | A | 10/1999 | Sit et al. |
| 5,963,870 | A | 10/1999 | Chheda et al. |
| 5,974,106 | A | 10/1999 | Dupont |
| 5,978,855 | A | 11/1999 | Metz et al. |
| 5,991,286 | A | 11/1999 | Labonte et al. |
| 6,009,310 | A | 12/1999 | Motohashi |
| 6,035,008 | A | 3/2000 | Kim |
| 6,052,408 | A | 4/2000 | Trompower et al. |
| 6,072,839 | A | 6/2000 | Mondal et al. |
| 6,075,787 | A | 6/2000 | Bobeck et al. |
| 6,111,887 | A | 8/2000 | Daily et al. |
| 6,112,232 | A | 8/2000 | Shahar et al. |
| 6,128,588 | A | 10/2000 | Chacon |
| 6,140,911 | A | 10/2000 | Fisher et al. |
| 6,141,356 | A | 10/2000 | Gorman |
| 6,157,311 | A | 12/2000 | Berkovich |
| 6,160,447 | A | 12/2000 | Huang |
| 6,172,970 | B1 | 1/2001 | Ling et al. |
| 6,185,227 | B1 | 2/2001 | Sipola |
| 6,195,697 | B1 | 2/2001 | Bowman-Amuah |
| 6,594,467 | B2 * | 7/2003 | Asia et al. ............. 455/3.03 |
| 6,650,451 | B1 * | 11/2003 | Byers et al. ............. 398/129 |
| 6,650,624 | B1 * | 11/2003 | Quigley et al. ............. 370/252 |
| 7,113,484 | B1 * | 9/2006 | Chapman et al. ............. 370/252 |
| 2002/0036985 | A1 * | 3/2002 | Jonas et al. ............. 370/235 |

FOREIGN PATENT DOCUMENTS

| | | |
|---|---|---|
| EP | 0021 544 A1 | 1/1981 |
| EP | 0025 767 A1 | 3/1981 |

OTHER PUBLICATIONS

Stiliadis, D. et al. (1998) "Rate-Proportional Servers: A Design Methodology for Fair Queueing Algorithms", *IEEE/ACM Transactions of Networking* 6(2):164-174.

Stiliadis, D. et al. (1998) "Efficient Fair Queuing Algorithms for Packet-Switched Networks", *IEEE/ACM Transactions of Networking* 6(2):175-185.

Data Over Cable Interface Specifications, Cable Modem Termination System-Network Side Interface Specification, SP-CMTS-NSII01-960702 (Jul. 2, 1996) pp. i-13.

Data-Over-Cable Service Interface Specifications, Cable Modem to Customer Premise Equipment Interface Specification. SP-CMC1-102-980317 (Mar. 17, 1998) pp. i-40.

Data-Over-Cable Service Interface Specifications, Radio Frequency Interface Specification, SP-RFI-104-980724 (Jul. 24, 1998), pp. i-196.

Data-Over-Cable Service Interface Specifications, Operations Support System Interface Specification SP-OSSI-102-990113 (Jan. 13, 1999) pp. i-14.

Data-Over-Cable Service Interface Specifications, Operations Support System Interface Specification Radio Frequency Interface, SP-OSSI-RFI-103-990113 (Jan. 13, 1999) pp. i-29.

Data-Over-Cable Service Interface Specifications, Baseline Privacy Interface Specification, SP-BPI-102-990319 (Mar. 19, 1999) pp. i-88.

Data-Over-Cable Service Interface Specifications, Baseline Privacy Interface Specification, SP-BPI-102-990731 (Jul. 31, 1999) pp. i-160.

Data-Over-Cable Service Interface Specifications, Radio Frequency Interface Specification, SP-RFIv1.1-103-991105 (Nov. 5, 1999) pp. i-366.

Data-Over-Cable Service Interface Specifications, Operations Support System Interface Specification SP-OSSlv1.1-D01-991115 (Nov. 15, 1999) pp. i-81.

Data-Over-Cable Service Interface Specifications, Operations Support System Interface Specification SP-OSSlv1.1-103-001220 (Dec. 20, 2000) p. ii.

* cited by examiner

Fig 1:

PRIOR ART

PROGRAMMABLE PHY FOR BROADBAND WIRELESS ACCESS SYSTEMS

CROSS REFERENCE TO RELATED APPLICATIONS

This invention claims priority to the following co-pending U.S. provisional patent applications, each of which are incorporated herein by reference, in their entirety:

Shahar, Provisional Application Ser. No. 60/178,156, entitled "Programmable PHY For Broadband Wireless Access," filed, 26 Jan., 2000;

Jonas et al, provisional Patent Ser. No. 60/178,138, entitled "Two Dimensional Scheduling Scheme For Broadband Wireless Access System," filed, 26 Jan., 2000; and Asia et al, provisional Patent Ser. No. 60/178,303, entitled "A Unidirectional Communication Scheme For Remote Maintenance And Control in A Broadband Wireless Access System," filed, 26 Jan., 2000.

BACKGROUND OF THE INVENTION

1. Field of Invention

The present invention relates to broadband wireless access systems and, among other things, to a programmable PHY for use in broadband wireless access systems.

2. Discussion of Background

Point to multi-point fixed broadband wireless access systems over Multichannel Multipoint Distribution System (MMDS) networks are known in broadcast situations. These networks operate over licensed bands including the MMDS band (2,150 to 2,162 MHz), the Wireless Communication System (WCS) band (2,305 to 2,311 MHz) and the Institutional Television Fixed Service/Multichannel Multipoint Distribution System (ITFS/MMDS) bands (2,500 to 2,686 MHz).

Figure 1:
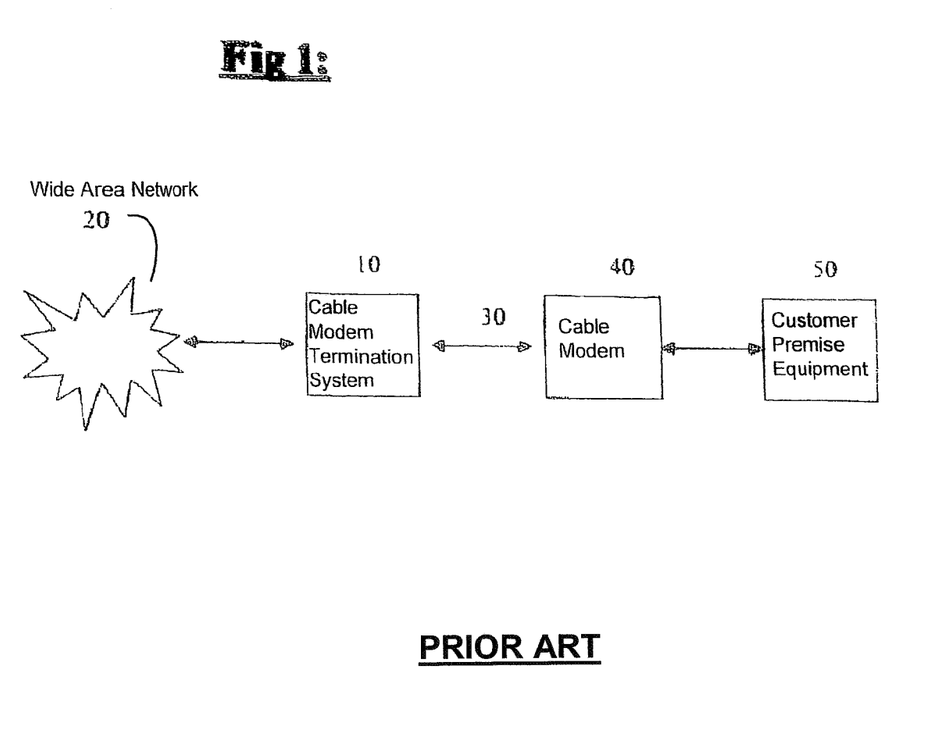
FIG. 1 is an overview of a known data over cable system.

A known wireless broadband access system, which operates at a range of between 50 MHz and 864 MHz, but not in the MMDS, WCS, or ITFS/MMDS bands, is the data over cable specification system, which is specified in the data over cable system interface specifications (DOCSIS). An overview of a wireless DOCSIS system is depicted in FIG. 1. A Cable Modem Termination System (CMTS) 10 communicates with a wide area network 20, such as the Internet. The CMTS 10 can transmit signals from the wide area network 20 along a cable network 30 through cable modems 40 to Customer Premise Equipment (CPE) 50. CPE 50 messages can be transmitted to the wide area network 20 through the cable modem 40 along the cable network 30 to the CMTS 10.

In point to multi-point broadband wireless access systems one central end-point, e.g. the head-end, communicates through a bi-directional link or links with multiple end-points, e.g. the nodes. The number of nodes in communication varies in time and can be none, one or two or more at any specific time.

The link(s) between the head-end and the nodes are combined in one or more channels. The signal path from the central end-point to the nodes is referred to as downstream, while the signal path from the nodes to the central end-point is referred to as upstream.

A single upstream channel can be used to deliver information from a node to the head-end and downstream channels are used from the head-end to a node or a group of nodes. If a single upstream channel is used for communication from the nodes(s) to the central point, then only one end-point can sends information on the single upstream channel at any one time.

Additionally, in such a system the diverse topological conditions of each user within the service area in terms of factors such as signal to noise, multi-path and fading makes it difficult to implement a flexible communication scheme that will enable per user optimization with respect to robustness and throughput.

SUMMARY OF THE INVENTION

In one embodiment, the present invention provides for a system and method for communication between a wireless modem and wireless hub on a selected downstream channel of a plurality of downstream channels. The selected downstream channel is selected by the wireless modem after receiving communication parameters for each of the downstream channels and selecting the selected downstream channel by determining the most efficient of the downstream channels at that time for downstream communication.

In another embodiment, the present invention provides for a system and method for communication between a wireless modem and wireless hub on a selected one downstream channel of a plurality of downstream channels. The selected upstream channel is selected by the wireless modem after receiving communication parameters for each of the upstream channels and selecting the selected upstream channel by determining the most efficient of the upstream channels at that time for upstream communication. It is also possible that this embodiment, is combined with the first embodiment such that the plurality of upstream channels are associated with the selected downstream channel.

The present invention may be embodied as a method for selecting a channel for communication between two wireless devices, comprising the steps of synchronizing a wireless modem with a wireless hub on a downstream channel of a plurality of downstream channels by synchronizing the symbol timing, forward error correction framing, and recognition of a synchronization message at the wireless modem, the channel of the plurality of downstream channels being transmitted from the wireless hub to a plurality of wireless modems including the wireless modem, receiving at the wireless modem on the downstream channel a message comprising information regarding the parameters for communicating over each of the plurality of downstream channels, determining a selected downstream channel of the plurality of downstream channels for communication with the wireless hub, and re-synchronizing the wireless modem with the wireless hub on the selected downstream channel of the plurality of downstream channels.

Figure 6A:
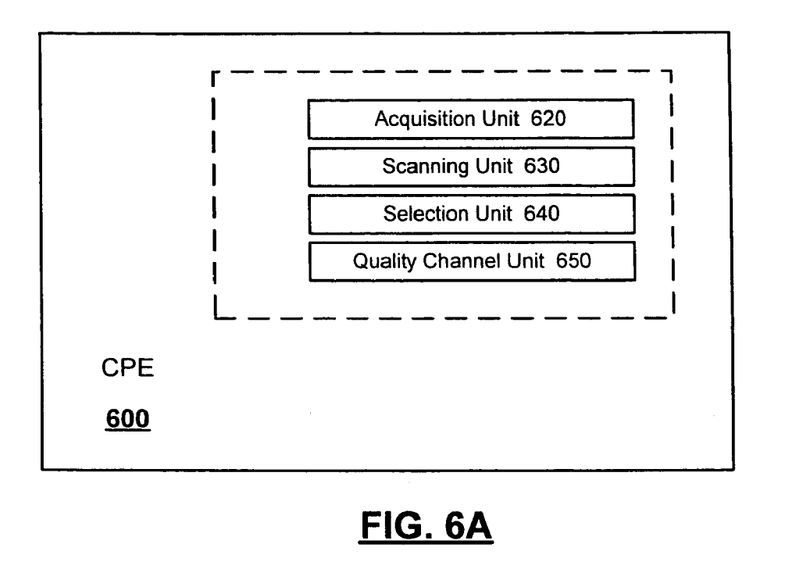
FIG. 6A is a drawing of a Customer Premise Equipment (CPE) including acquisition, scanning, and selection units according to an embodiment of the present invention.
Figure 6B:
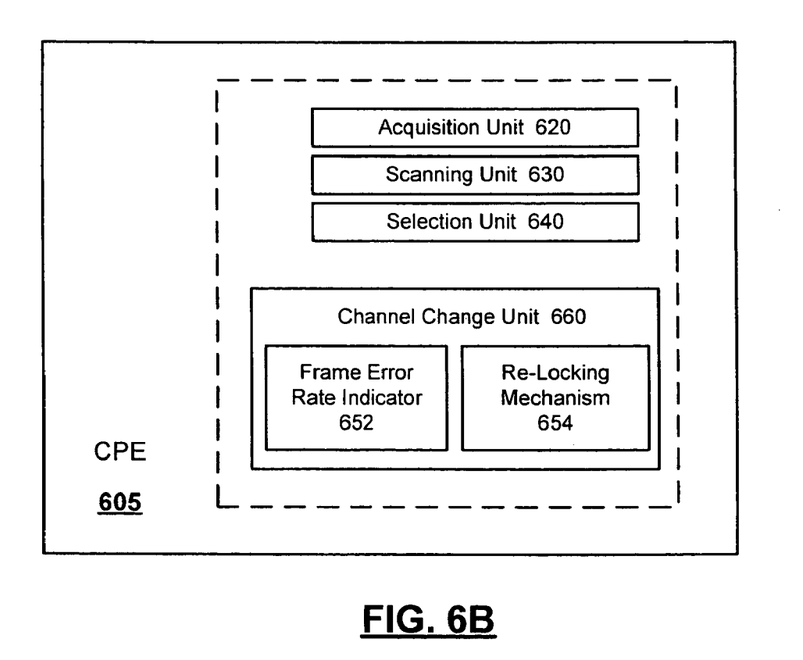
FIG. 6B is a drawing of a CPE including a channel change Unit according to an embodiment of the present invention.

The present invention may also be embodied as a wireless communication system, comprising, a wireless hub configured to send downstream communications on at least one of a set of predefined downstream channels and receive upstream communications on at least one of a set of predefined upstream channels, at least one wireless modem (e.g., see FIG. 6A/6B CPE 600/605) configured to receive said downstream communications, and send said upstream communications, wherein said wireless modem comprises, an acquisition unit (e.g. acquisition unit 620) configured to acquire a predefined downstream channel transmitted by said hub and read DCD messages describing available downstream channels, a scanning unit (e.g. scanning unit 630 configured to scan the available downstream channels, and a selection unit (e.g. selection unit 640) configured to select the best available downstream channel. In one embodiment, illustrated in FIG. 6A, the wireless modem (e.g., CPE 600) further comprises a channel quality unit configured to build a list of available channels indicating a quality of reception on each channel. In another embodiment, illustrated in FIG. 6B, the wireless communication system (e.g., including CPE 605) further comprises a channel change unit 660 having, a frame error rate indicator 652 configured to identify when a frame error rate of a current downstream channel is unacceptable, and a re-locking mechanism 654 configured to acquire a new downstream channel.

Figure 6C:
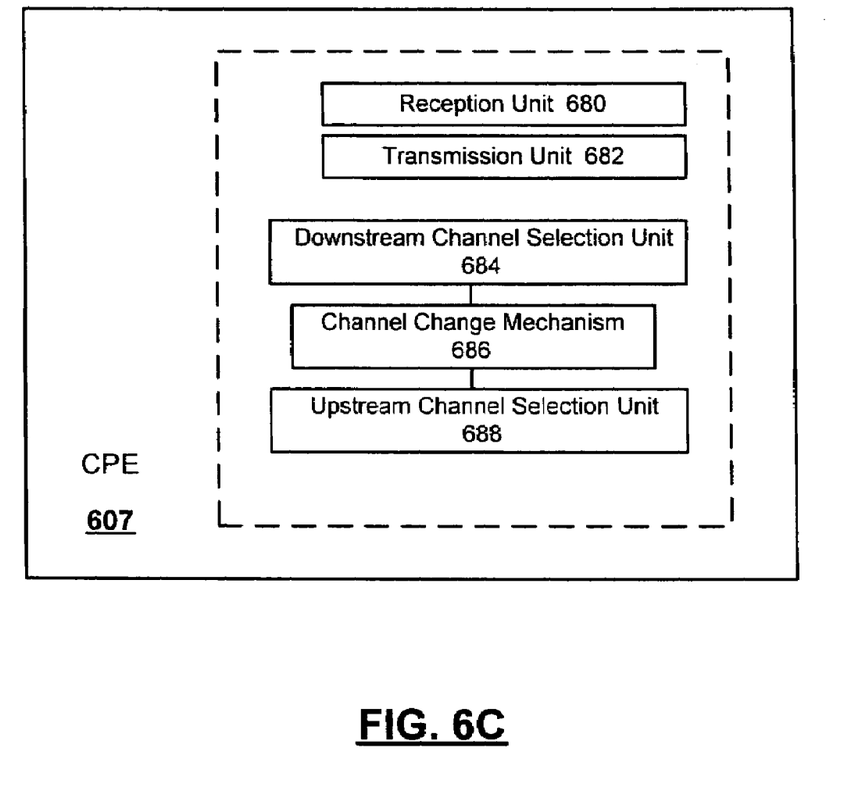
FIG. 6C is a drawing of CPE including a channel change mechanism according to an embodiment of the present invention.
Figure 7:
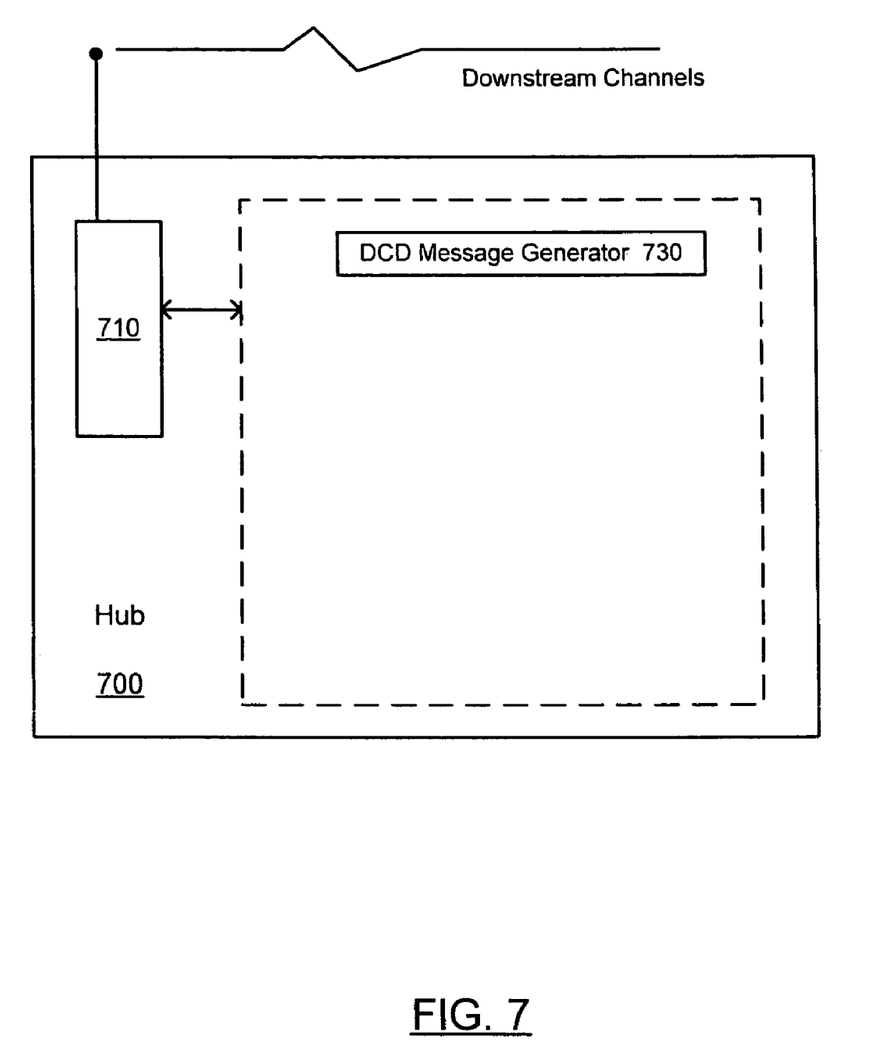
FIG. 7 is a drawing of a hub utilizing a Downstream Channel Descriptor (DCD) message generator according to an embodiment of the present invention.

The present invention also includes a communication device, comprising, a hub (e.g., see FIG. 7, Hub 700) configured to send downstream communications on at least one of a set of predefined downstream channels and receive upstream communications on at least one of a set of predefined upstream channels, wherein: said hub includes a DCD message generator (e.g. DCD Message Generator 730) that constructs at least one DCD message sent on said downstream channels, and said at least one DCD message defines all downstream channels utilized by said hub. In one embodiment, as illustrated in FIG. 6C, the present invention is a modem unit (e.g. CPE 607) for use in a communication system, comprising, a reception unit configured to receive downstream communications on a current downstream channel, and a downstream channel selection unit to read DCD messages received by said reception unit and select a best available channel as said current downstream channel from priorities contained in said DCD messages. In more detail, the modem unit may further comprise a transmission unit configured to transmit data from said device on a current upstream channel, and an upstream channel selection unit configured to select the current upstream channel based on priorities of upstream channels described in an UCD message received by said reception unit. In one embodiment, the upstream channel selection unit and said downstream channel selection unit include a change channel mechanism configured to change either the current upstream channel or current downstream channel based on the priorities contained in the respective DCD and UCD messages.

The present invention also includes a modem unit for use in a communication system, comprising, a reception unit (e.g. Reception Unit 680) configured to receive downstream communications on a current downstream channel, and a downstream channel selection unit (e.g. Downstream Channel Selection Unit 684) configured to read DCD messages received by said reception unit and select a best available channel as said current downstream channel from priorities contained in said DCD messages. In one embodiment, the modem unit further comprises a transmission unit 682 configured to transmit data from said device on a current upstream channel, and an upstream channel selection unit 688 configured to select the current upstream channel based on priorities of upstream channels described in an UCD message received by the reception unit 680. In one embodiment, the upstream channel selection unit 688 and the downstream channel selection unit 684 include a change channel mechanism 686 configured to change either the current upstream channel or current downstream channel based on the priorities contained in the respective DCD and UCD messages.

Each of the method, system, device, and modem may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
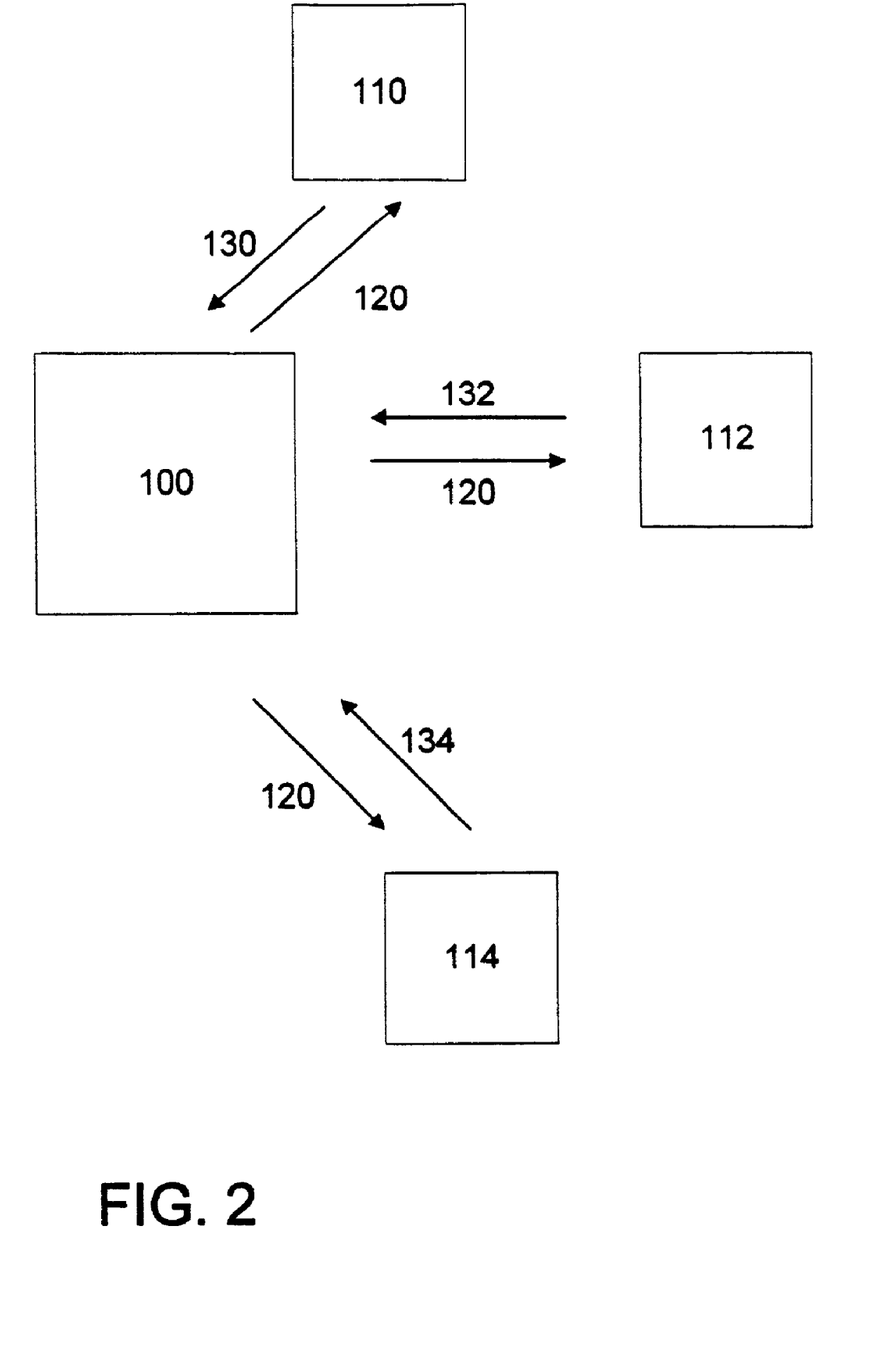
FIG. 2 is a block diagram of a wireless hub communicating with a wireless modem in a broadband wireless access system according to a presently preferred embodiment of the present invention.

Referring again to the drawings, wherein like reference numerals designate identical or corresponding parts, and more particularly to FIG. 2 thereof, there is illustrated, in the presently preferred embodiment, a single carrier modulation scheme is selected for both downstream communication 120 and upstream communication 130, between a wireless hub 100 and a wireless modem 110. The wireless modem 110 can be one of a plurality of wireless modems (e.g. wireless modems 110, 112, 114, and upstream communications 130, 132, and 134 respectively) in communication with the wireless hub 130. The selection of a single carrier modulation scheme allows for the flexibility of multiple single carrier constellations, multiple channel bandwidth, multiple roll off factors, multiple symbol rates, multiple FEC schemes and multiple preambles (upstream only). Further, the wireless modem can be considered a customer premises indoor unit (CPE IDU) that communicates with a customer premises outdoor unit (CPE ODU), that includes the transmission and reception equipment for the customer device. The wireless hub also utilizes one or more outdoor and indoor units, each set of which can be referred to as a Wireless Modem Termination System (WMTS) or Base Station (BS).

The presently preferred parameters for the downstream channel are described in Table 1 below.

TABLE 1

| Constellation | Symbol rate | Channel BW | Roll off | FEC |
|---|---|---|---|---|
| 64QAM | 5.056941 Msps | 6 MHz | .18 | ITU-T J.83 Annex B |
| 64QAM | 6.942 Msps | 8 MHz | .15 | ITU-T J.83 Annex A |
| 16QAM | | | | |
| QPSK | | | | |
| 64QAM | 5.304 Msps | 6 MHz | .13 | ITU-T J.83 Annex A/C |
| 16QAM | | | | |
| QPSK | | | | |
| 64QAM | 3.536 Msps | 4 Mz | .12-.15 | ITU-T J.83 Annex A/C |
| 16QAM | | | | |
| QPSK | | | | |
| 64QAM | 1.768 Msps | 2 MHz | .12-.15 | ITU-T J.83 Annex A/C |
| 16QAM | | | | |
| QPSK | | | | |
| 64QAM | 1.326 Msps | 1.5 MHz | .12-.15 | ITU-T J.83 Annex A/C |
| 16QAM | | | | |
| QPSK | | | | |
| VSB | | | | DVB-T |
| QPSK | | | | DVB-S ⅞, ⅚, ¾, ⅔, ½ |

In operation, it is preferred that a downstream demodulator in the wireless modems employ an equalizer with which can compensate a delay spread of more than 10 μs @ 5 Msps. The 10 μs figure is calculated as a maximum delay spread due to a number of factors such as multi-path. Although 10 μs is preferred, the delay spread may typically range from 0 to 20 μs The presently preferred parameters for the upstream channel are described in the table 2 below:

TABLE 2

| Constellation | Symbol Rate | Channel Width |
|---|---|---|
| QPSK, 16QAM | 160 ksps | 200 kHz |
| QPSK, 16QAM | 320 ksps | 400 kHz |
| QPSK, 16QAM | 640 ksps | 800 kHz |
| QPSK, 16QAM | 1,280 ksps | 1,600 kHz |
| QPSK, 16QAM | 2,560 ksps | 3,200 kHz |

Although Tables 1 and 2 specify QAM and QPSK constellations, other constellations such as BPSK and other modulation types may be utilized in conjunction with the present invention without departing from its scope.

The presently preferred FEC employed in upstream transmission is a programmable Reed Solomon code as described in DOCSIS RFI document SP-RFIv1.1-I03-991105 chapters 4 & 5. DOCSIS RFI document SP-RFIv1.1-I03-991105, and the other DOCSIS specifications are incorporated herein by reference in their entirety as if fully set forth herein. While the presently preferred preamble is programmable as per DOCSIS RFI document SP-RFIv1.1-I06-001215 chapters 4 & 5, a long preamble is used for per-burst post equalization by the burst receiver.

The diverse propagation conditions of the users within the serving area call for the independent selection of an upstream and a downstream channel pair for each wireless modem, user, from a group of available channels. The selection of the channel pair is performed during initialization and is then preferably updated on a continuous basis.

The initialization procedure in general is based on the DOCSIS initialization procedure as described in RFI Specifications SP-RFIv1.1-I06-001215, chapter 9.2.

The following are additional functions that are preferred to be performed in addition to the RFI DOCSIS specification to facilitate the wireless channel selection:

A MAC domain is defined as a group of several downstream channels and several upstream channels. This will typically be the group of channels that can be used by the user population, the wireless modems, in communication with the particular wireless hub, within a serving area (e.g., a sector of an MMDS cell).

A sector refers to one location that serves an area, each channel serves only a certain geographic sector, using a directional antenna. For example, one antenna for a quadrant between north and east, a second antenna for the quadrant from east to south, a third antenna for the quadrant between south and west, and a fourth antenna for the quadrant between west and north (however, many different variations of sector size, including sectors of unequal area may also be utilized). The sectors may be numbered for identification (1=N&E, 2=E&S, 3=S&W, and 4=W&N, for example).

The several downstream and upstream channels of the MAC domain are typically:
1. Controlled by the same entity;
2. Modems and service Ids are unique; and
3. A modem uses downstream and upstream channels in the same MAC domain.

Any new MAC messages defined below, which are not defined in any of the DOCSIS current standards, and MAC messages that have been changed and are DOCSIS non-complaint are presently preferred to be indicated by a new type number. For example, for the current version 1.1, of DOCSIS, all new or non-complaint MAC messages would have a type number of 129 and larger.

All downstream channels within the MAC domain will have transmitted on them a Bandwidth Allocation messages with respect to all the upstream channels within the group. These Bandwidth Allocation messages can be standard DOCSIS MAP messages or the MAP2D message described in Provisional Patent Application, Ser. No. 60/178,138, titled "Two-Dimensional Scheduling Scheme For A Broadband Wireless Access System," by the same inventors of this application.

All downstream channels within the MAC domain will further include a Downstream Channel Descriptor (DCD) messages. These DCD messages will be transmitted periodically to the wireless modems by the wireless hub. Once a wireless modem acquires a downstream channel (one of the downstream channels available within the MAC domain), the wireless modem will capture the DCD message with respect to all the downstream channels that belong to the MAC domain. The DCD message will contain the following information for each downstream channel: (1) IF frequency; (2) RF frequency; (3) Modulation type; (4) Symbol rate; (5) bandwidth; (6) roll off factor; (7) FEC Scheme; (8) Criteria for switching to another downstream channel; (9) priority information to select a downstream channel for communication for a newly initializing modem; and (10) priority information when switching to a new downstream channel for a modem already in communication with wireless hub.

A single DCD message describes channels that service the same sector. If a downstream channel can service more than one sector, it is included in all the respective DCD messages. The information on all the downstream channels for a sector is included in a single DCD messages or may be delivered in a separate DCD messages. An advantage to separate DCD messages is that smaller messages are more robust.

The WMTS generates DCD messages in the format shown in Table 3, including all of the following parameters:

TABLE 3

Downstream Channel Descriptor (DCD)

| Bit | 0 | 8 | 16 | 24 | 31 |
|---|---|---|---|---|---|
| | Mac Management Message Header | | | | |
| | Cell ID | Sector ID | Configuration Change Count | | Reserved |
| | TLV-encoded information for the overall sector | | | | |
| | TLV-encoded information for A channel descriptor | | | | |
| | TLV-encoded information for The subsequent channel descriptors | | | | |

There may be more than one channel descriptor in one DCD message. Each channel description (see table 6) defines one channel. There is no difference between the formats of preceding and subsequent channel descriptions.

TABLE 4

Downstream Channel Descriptor Descriptions

| | |
|---|---|
| MAC Management Message Header | As defined in DOCSIS Type = 129. |
| Sector ID | Identifier of the geographic sector, which can use these downstream channels (1-255). If sector information is not used, a single value should be indicated in all DCD messages. |
| Cell ID | Identifier of the Cell where this message is transmitted (1-255). If cell information is not being used, a single value should be indicated in all DCD messages. |
| Configuration Change Count (8 bits) | Incremented by one (modulo the field size) by the WMTS-IDU, whenever any of the values of any of the downstream channel descriptors change. |

All other parameters are presently preferred to be coded as Time Length Value (TLV) fields, as defined in DOCSIS RFI specification 6.2.1.3.2. The advantage of TLV fields for application of the present invention is the flexibility to allow different field combinations in the message being transmitted and the ability to upgrade by adding additional types while maintaining backward compatibility. The type values used are defined in table 5, for sector parameters, and table 6, for downstream channel attributes. Sector-wide parameters (types 1-2 in Table 3) are presently preferred to be required to precede channel descriptors (type 3 below).

TLV (Time Length Value) parameters for the overall MAC domain downstream are described in Table 5 below:

TABLE 5

Sector TLV Parameters

| Name | Type (1 byte) | Length (1 byte) | Value (Variable length) |
|---|---|---|---|
| Control channel | 1 | 1 | Downstream ID for the channel to be used as control channel. |
| Number of channels | 2 | 1 | Number of downstream channels that are available for this sector. This number may include channels that are defined in other DCD messages. |

TABLE 5-continued

Sector TLV Parameters

| Name | Type (1 byte) | Length (1 byte) | Value (Variable length) |
|---|---|---|---|
| Channel Descriptor | 3 | Variable | May appear more than once. Described below. The length is the number of bytes in the overall object, including embedded TLV items. |

Channel descriptors are compound encoded TLVs that define the parameters, for each downstream channel. Within table 6 each channel descriptor is an unordered list of attributes, encoded as TLV values:

TABLE 6

Channel TLV Parameters

| Name | Type (1 byte) | Length (1 byte) | Value (Variable length) |
|---|---|---|---|
| Downstream Channel ID | 1 | 1 | The Identifier of the downstream channel to which this message refers. |
| RF Frequency | 2 | 4 | RF frequency in KHz |
| IF Frequency | 3 | 4 | IF frequency in KHz |
| Modulation type | 4 | 1 | 0 = Adaptive, 1 = QPSK, 2 = 16QAM, 3 = QAM64, 4 = QAM256 |
| Symbol rate | 5 | 4 | Symbol rate (bps) |
| Bandwidth | 6 | 4 | Bandwidth (Hz) |
| Roll off Factor | 7 | 1 | 200 * Roll of factor |
| FEC scheme | 8 | 1 | 1 = ITU-T J.83 Annex A/C 2 = ITU-T J.83 Annex B 3 = Adaptive |
| FER Threshold | 9 | 4 | Threshold of failed MPEG Frames. If the number of failed frames is more than this number, a downstream channel switching MUST be initiated as defined in 0. The counting of failed frames is initialized after each measurement period as defined in the FER measurement period TLV parameter. |
| Priority for a new CPE IDU | 10 | 1 | Priority to be used by a new modem-Lowest number is higher priority. |
| Priority for changing channel | 11 | 1 | Priority to be used if the current channel has poor conditions-Lowest number is higher priority. |
| Cell ID | 12 | 1 | The Identifier of the Cell which transmit the described downstream channel |
| FER measurement period | 13 | 1 | Time period for MPEG Frame Error Rate measurement (See FER Threshold TLV parameter). Time is given in seconds, in the range of 1-255 Sec. |

The priority value is determined by the BS IDU. The priority is presently preferred to be dynamically changed by the WMTS-IDU between DCD messages. Such changes may be used to balance the load between the channels. A different priority can be assigned for a new initializing modem or to a registered modem that has to switch channel due to poor RF conditions. The later priority may depend on the current channel, in such a way that different priorities will be assigned in DCD messages that are delivered on different channels.

The method to assign priority values to each channel is operator dependent. A presently preferred priority assignment method is to simply calculate the ratio of channel bandwidth to per user on each channel, where the number users used in the calculation is one plus the number of actual users. The highest priority is then preferably assigned to those channels that have the highest ratio, i.e. those with the largest bandwidth per user are assigned the highest priority. Another method to assign priorities would be to use fixed priorities, such as: Higher priority for a higher order modulation scheme; For the same modulation, higher priority for a higher symbol rate; For the same modulation and symbol rate, higher priority for a stronger FEC scheme.

Although other priorities schemes may be utilized, it is preferred that the priorities are assigned a numerical designation of priority. For example, when a modem initializes, it will try to use priority 1 channels. If this fails, the modem will attempt to initialize on priority 2 channels and so on. If a modem is already on a channel but there are too many errors, the modem will try to work on other channels in the same way, but based on the priorities for changing channels.

The MAC domain id, which herein is equivalent to the sector id of the modem, may be required in if the upstream sectorization is different from the downstream sectorization (e.g. omni downstream channel with sectorized upstream). The MAC domain id can be used in this case by the wireless modem to determine whether the respective downstream channel is applicable to its transmission capability. This determination is done a—priori with information that is conveyed to the modem from a local terminal or remotely using a downstream control channel.

The modem will try to resynchronize to the "best" downstream channel by starting from channel the highest priority level field and continuing down the priority levels until it achieves synchronization.

Optionally, initial downstream channel acquisition will be facilitated by configuring one or more of the downstream channels with QPSK, BPSK or other modulation and letting the wireless modems search initially for this type of channel. This type of channel may be used as a control channel, therefore allowing for multiple control channels After this channel is established and a DCD message is received on this channel, the wireless modem can select the "best" downstream channel according to the above-described procedure.

Faster downstream acquisition can also be facilitated by preferably scanning only MMDS center frequencies.

All downstream channels within the MAC domain, which is also preferred to be the sector of the modem, will carry Upstream Channel Descriptors (UCD) messages with respect to all the upstream channels within the MAC domain. UCD messages with respect to upstream channels that do not belong to the MAC domain will not be transmitted on the downstream channels that belong to the MAC domain. Alternatively, in the case of a downstream channel that is used within more than a single MAC domain, each UCD message will have a MAC domain id field. This field as well as a priority field will be added to the standard DOCSIS UCD message structure. The priority field will be used by the wireless hub to allow prioritization of channels on a dynamic basis, considering criteria such as load balancing.

The presently preferred Upstream Channel Descriptor (UCD) message is altered from the UCD message specified in the DOCSIS specification by changing the TLV as described in table 7 below:

TABLE 7

Additional TLV parameters for Modified UCD message

| Name | Type (1 byte) | Length (1 byte) | Value (Variable length) |
|---|---|---|---|
| Sector | 129 | 1 | Identifier of the geographic sector which can use these downstream channels. This parameter may appear more than once, if the same upstream channel may be used by more than one sector. |
| Number of channels | 130 | 1 | Number of upstream channels that are available for this sector |
| Criteria for switching channels | 131 | Operator Defined | Channel attenuation, occurrence of unacknowledged transmissions, etc. |
| Priority for a new CPE IDU | 132 | 1 | Priority to be used by a new modem-Lowest number is higher priority. |
| Priority for changing channel | 133 | 1 | Priority to be used if the current channel has poor conditions-Lowest number is higher priority. |
| Cell ID | 136 | 1 | Identifier of the Cell where this message is transmitted. The described upstream channel should be used on this cell. |

The priority value is calculated dynamically by the wireless hub IDU. For each channel, the available bit rate (without PHY overhead) should be divided by the estimated number of active users on this channel, plus one. The channel with the highest result will get priority 1, the next 2, etc. In this scenario, the same priority will be used for both new modem initialization or for changing upstream channels for wireless modems already in communication with the WMTS.

Once a modem acquires a downstream channel, the modem will capture UCD messages with respect to all the upstream channels that belong to the sector. The modem will then select the "best" channel to range according the highest priority channel on which it is capable of completing a ranging transaction.

The above procedure will be repeated until the modem has successfully ranged and established IP connectivity with the wireless hub.

It is also possible for the modem to continuously monitor the DCD messages, which are periodically transmitted, and switch to another, more robust channel if the performance on the current channel is not acceptable. The downstream channel switching protocol and parameters are determined in the same way as described above with respect to selection of a downstream channel at initialization. However, the downstream channel changing protocols can also be different than that at initialization, since the wireless hub already has information regarding the communication capabilities for one or more channels of modem with which it is in communication.

When the wireless hub determines that the wireless modem should switch to another downstream channel it transmits a downstream channel change request (DCC-REQ). The format of a DCC-REQ message is shown in table 8 below:

TABLE 8

Downstream Channel Change Request

| Bit | 0 | 8 | 16 | 24 | 31 |
|---|---|---|---|---|---|
| | Mac Management Message Header | | | | |
| | Downstream ID | | | | |

The parameters of the DCC-REQ message of table 8 is defined in table 9 below:

TABLE 9

| Downstream Channel ID | The identifier of the downstream channel to which the CPE IDU is to tune for downstream transmissions. This is an 8-bit field. |
|---|---|

A Downstream Channel Change Response (DCC-RSP) is transmitted by the CPE IDU in response to a received Downstream Channel Change Request message to indicate that it has received the DCC-REQ and it is tuned to the new downstream channel. The DCC-RSP can be also be transmitted by the CPE IDU without a preceding DCC-REQ, if the CPE IDU switches a downstream channel, due to high signal to noise ratios, low received power, high error rates, or other reception problems. The format of a DCC-RSP message is shown in table 10 below.

TABLE 10

Downstream Channel Change Response

| Bit | 0 | 8 | 16 | 24 | 31 |
|---|---|---|---|---|---|
| | Mac Management Message Header | | | | |
| | Downstream ID | | | | |

Parameters of Table 10 are described in Table 11 below:

TABLE 11

| Downstream Channel ID | The identifier of the downstream channel to which the CPE IDU is tuned for downstream transmissions. This is an 8-bit field. |
|---|---|

The CPE IDU ignores a DCC-REQ message, by not responding with a DCC-RSP message, if it receives the DCC-REQ while it is in the process of performing a channel change. When a CPE IDU receives a DCC-REQ message requesting that it switch to a downstream channel that it is already using, the CPE IDU responds with a DCC-RSP message on that downstream channel indicating that it is already using the correct channel.

A Downstream Channel Change Acknowledgement (DCC-ACK) is transmitted by a BS IDU in response to a received Downstream Channel Change Response message to indicate that it has received the DCC-RSP. The format of a DCC-ACK message is shown in Table 12.

TABLE 12

Downstream Channel Change Acknowledgement

| Bit | 0 | 8 | 16 | 24 | 31 |
|---|---|---|---|---|---|
| | Mac Management Message Header | | | | |
| | Downstream ID | | | | |

Parameters of the DCC-ACK are shown below in table 13:

TABLE 13

| DownstreamChannel ID | The identifier of the downstream channel to which the CPE IDU is tuned for downstream transmissions. This is an 8-bit field. |
|---|---|

When the BS IDU receives a DCC-RSP message, regarding the current downstream channel of the CPE IDU, according to the BS IDU tables, the BS IDU MUST respond with a DCC-ACK message on that channel indicating that it is already using the correct channel.

The full procedure for changing channels is described in Section 6 of the DOCSIS RFI Specification version 1.1.

An Upstream Channel Change Response is transmitted by a BS IDU in response to a received Upstream Channel Change Response message to indicate that it has received the UCC-RSP. When a BS IDU receives a UCC-RSP message, regards the current upstream channel group of the CPE IDU, according to the BS IDU tables, the BS IDU MUST respond with a UCC-ACK message, indicating that it is already using the correct channel group.

TABLE 14

Upstream Channel Change Acknowledgement

| Bit | 0 | 8 | 16 | 24 | 31 |
|---|---|---|---|---|---|
| | Mac Management Message Header Upstream group ID | | | | |

Parameters of Table 14 are as follows:

TABLE 15

| Downstream Channel ID | The identifier of the downstream channel to which the CPE IDU is tuned for downstream transmissions. This is an 8-bit field. |
|---|---|

Acquisition of a Downstream Channel

BS IDU Requirements

The BS IDU should periodically transmit a Downstream Channel Descriptor (DCD) message. This message defines the available downstream channels. The BS IDU may be configured to send a single DCD message (on each channel), which describes all the available channels. Another option is to send a separate message for each downstream channel. The second alternative enables more reliable reception, due to a shorter message length, on a poor channel. The DCD messages, for all the downstream channels that serve one downstream sector, should be transmitted on each of these downstream channels.

CPE IDU Requirements

Initial Connection

1. A CPE should first try to lock on any downstream channel to get an updated DCD message (See FIG. 3, step 300). The CPE evaluates channels according to the following order:

a. A control channel that may be optionally pre-configured locally or remotely to the CPE-IDU. A list of standard control channels may be optionally pre-configured into the wireless modem. In addition, the control channel identification may be changed during operation by one or more of the following methods: (i) locally, by a technician, (ii) remotely, by using the SNMP to transmit instructions during downstream communication, (iii) remotely, using a unidirectional service mode, such as described in U.S. Provisional Patent Application Ser. No. 60/178,303, now U.S. Pat. No. 6,594,467, which is incorporated herein by reference, in its entirety, as an example; and (iv) remotely, in a DCD message transmitted during a previous operating session of the wireless modem. If the wireless modem cannot lock on a control channel or the specific implementation does not make use of control channels or the wireless modem has not configured with the control channels list, the CPE-IDU will skip this step.

b. The last channel where the CPE has been connected in a previous session.

c. The other channels which have been defined by DCD message in previous session.

d. Scanning the entire available spectrum and automatically acquire the modulation and channel width.

Figure 3:
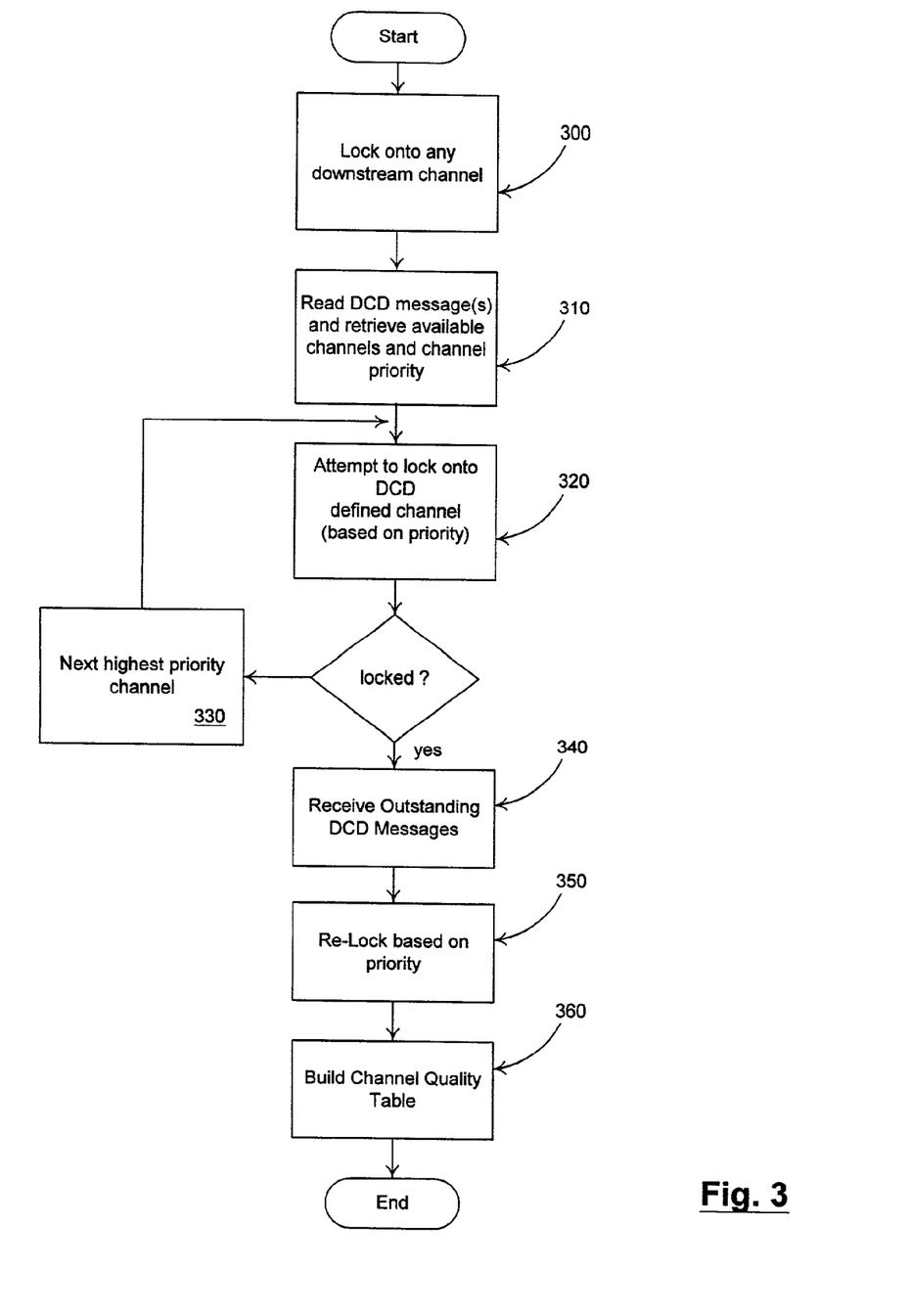
FIG. 3 is a flow chart illustrating acquisition of a downstream channel according to an embodiment of the present invention.

2. After successful acquisition of the first downstream channel, as defined in DOCSIS, the CPE waits for a DCD message (step 310). If a non-zero sector ID is configured for the CPE, only DCD messages with this sector ID should be processed. If necessary, as indicated by the "Number of Channels" parameter in the DCD message, it continues to receive DCD messages until it has the parameters for all the channels.

The sector parameters of a wireless modem are preferably configured by one of the following methods: (i) locally, by a technician, (ii) remotely, by using the SNMP to transmit instructions during downstream communication, (iii) remotely, using a unidirectional service mode, and (iv) remotely, utilizing Sector Configuration List (SCL) messages which contain MAC addresses for the sectors in which the modem is capable of communicating.

If a CPE IDU is assigned manually or automatically a Sector ID of zero, it may use all the upstream and downstream channels, regardless of their defined sector.

3. If after a configured time out, (10 Seconds is a typical value), which starts when the CPE is synchronized to the downstream channel, as defined in 9.2.1 of the DOCSIS specifications, the CPE has not received all the DCD messages, it tries to lock on the channels defined by the received DCD messages (with sector limitation, if defined), following the priority order (step 320). These channels should then be used to receive the DCD messages for the remaining channels for which a DCD message was not received (step 340).

4. After receiving the parameters of all the available downstream channels for its sector, a CPE will try to lock on the downstream channels, according to the assigned priorities for a new CPE (step 350). The channel to be selected is the acceptable one with highest priority. The acceptable channel with highest C/N ratio is selected from channels with the same priority. Acceptable channel is a channel where the CPE can successfully complete the registration process. The following process achieves this selection:

The CPE MAY skip channels that it has failed to lock on during the previous steps. A CPE should start with the highest priority channels and proceed to lower priorities, until it successfully connects to a channel (receiving SYNC messages, as defined by DOCSIS). After successfully connecting to a channel, the CPE should continue to check all the channels with the same priority. The channel with highest C/N ratio from these channels, with the same priority, is selected and used to continue with upstream acquisition. If upstream acquisition, using this channel fails, the next downstream channel is used.

5. The CPE should establish a channel quality table (step 360). The table should include the following parameters for each channel:

a. Acquisition result—Success, one failure or two failures. Should be stored for each tested channel. Other channels should be marked as unknown.

b. Carrier to Noise ratio—Should be stored for each acquired channel.

c. Motion Picture Expert Group (MPEG) frames error rate—The measurement period should be as defined in the DCD FER measurement period TLV parameter. The measurement can be terminated earlier if the error rate threshold is exceeded.

d. A channel status should be changed to unknown after T9 interval without being tuned to that channel.

Changing of a Downstream Channel

Figure 4:
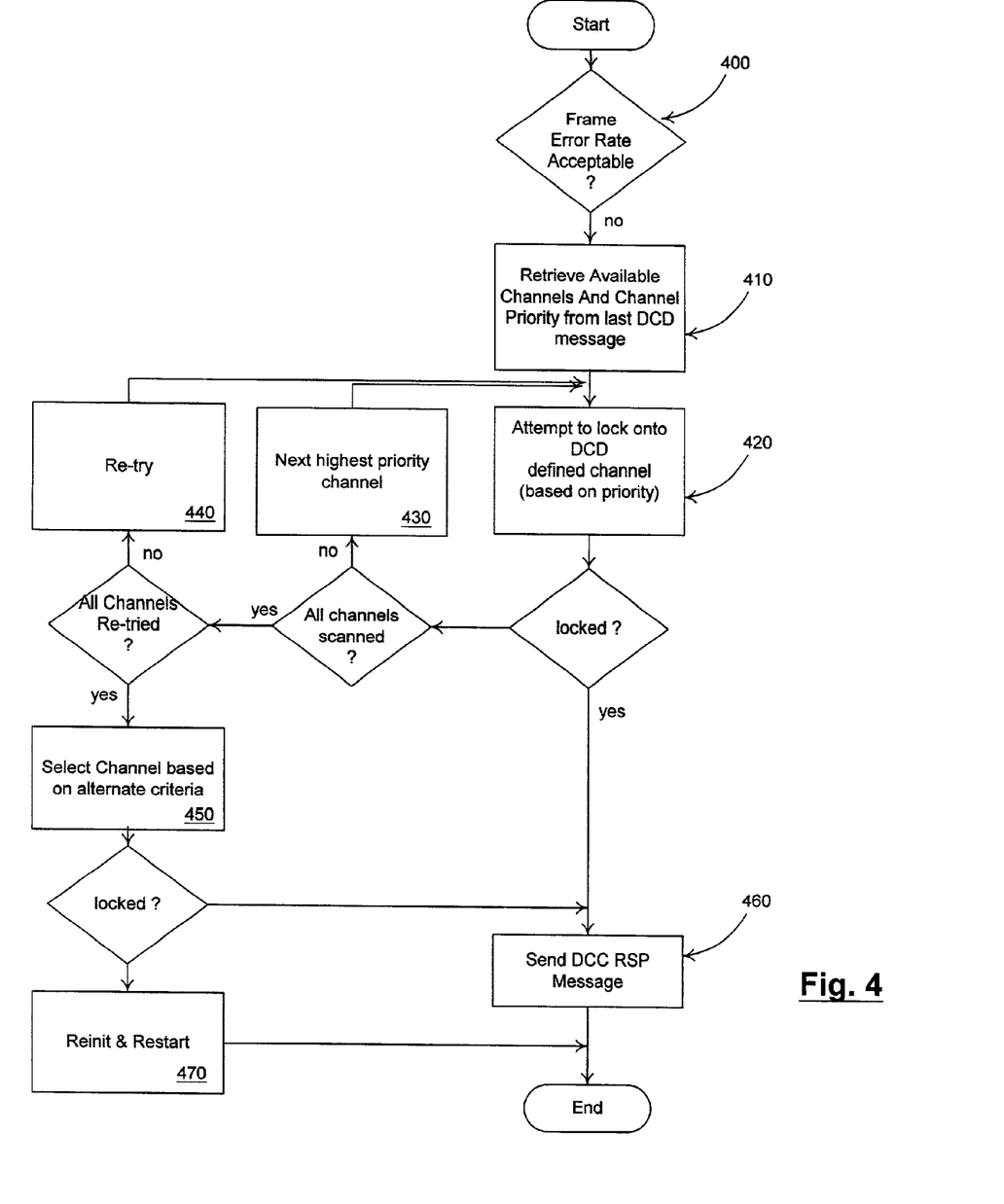
FIG. 4 is a flow chart illustrating changing of a downstream channel according to an embodiment of the present invention.

If the frame error rate on the current downstream channel is not acceptable, according to the "FER Threshold" TLV parameter in the DCD message, the CPE should switch a downstream channel (See FIG. 4, step 400). It should use the information from the last successfully received DCD messages (step 410). The CPE should try to lock on the downstream channels, according to the assigned priorities for changing channel (steps 420/430). Channels that have been tried in the previous configured time period (10 minutes typical) should be skipped. When the CPE acquires successfully the new downstream channel, it should transmit a DCC-RSP message and wait for a DCC-ACK message from the BS (step 460). If a DCC-ACK is not received by the CPE within configure timeout (2 seconds typical) it should retransmit DCC-RSP. These retransmissions should be repeated after each period of this timeout until a DCC-ACK is received or a configured timeout (typically 30 seconds) has passed since the first DCC-RSP transmission. After that timeout the CPE should initiate an initial upstream channel acquisition with initial ranging and registration.

If the CPE cannot acquire a downstream channel after scanning all the channels (no "unknown" status channel), it should retry, by priority order, the previously failed channels ("One failure" status) (step 440). If the CPE still cannot acquire a downstream channel, it should select the channel with success indicator and best MPEG frame error rate (step 450). If all the channels are marked as "Two failures", the entire channels table should be initialized to "unknown" state and the CPE should restart initial acquisition starting from the highest priority channel, without skipping any previously tried channels (step 470).

Acquisition of an Upstream Channel

BS IDU Requirements

The BS IDU should periodically transmit an Upstream Channel Descriptor (UCD) message. This message is based on the UCD message that is defined DOCSIS, with extensions defined above. The UCD message, for each upstream channel, may be transmitted on all or some of the downstream channels. Transmitting UCD messages on a subset of the downstream channels may be used to limit the upstream channel selection, based on the downstream channel selection.

CPE IDU Requirements

Initial Connection

Figure 5:
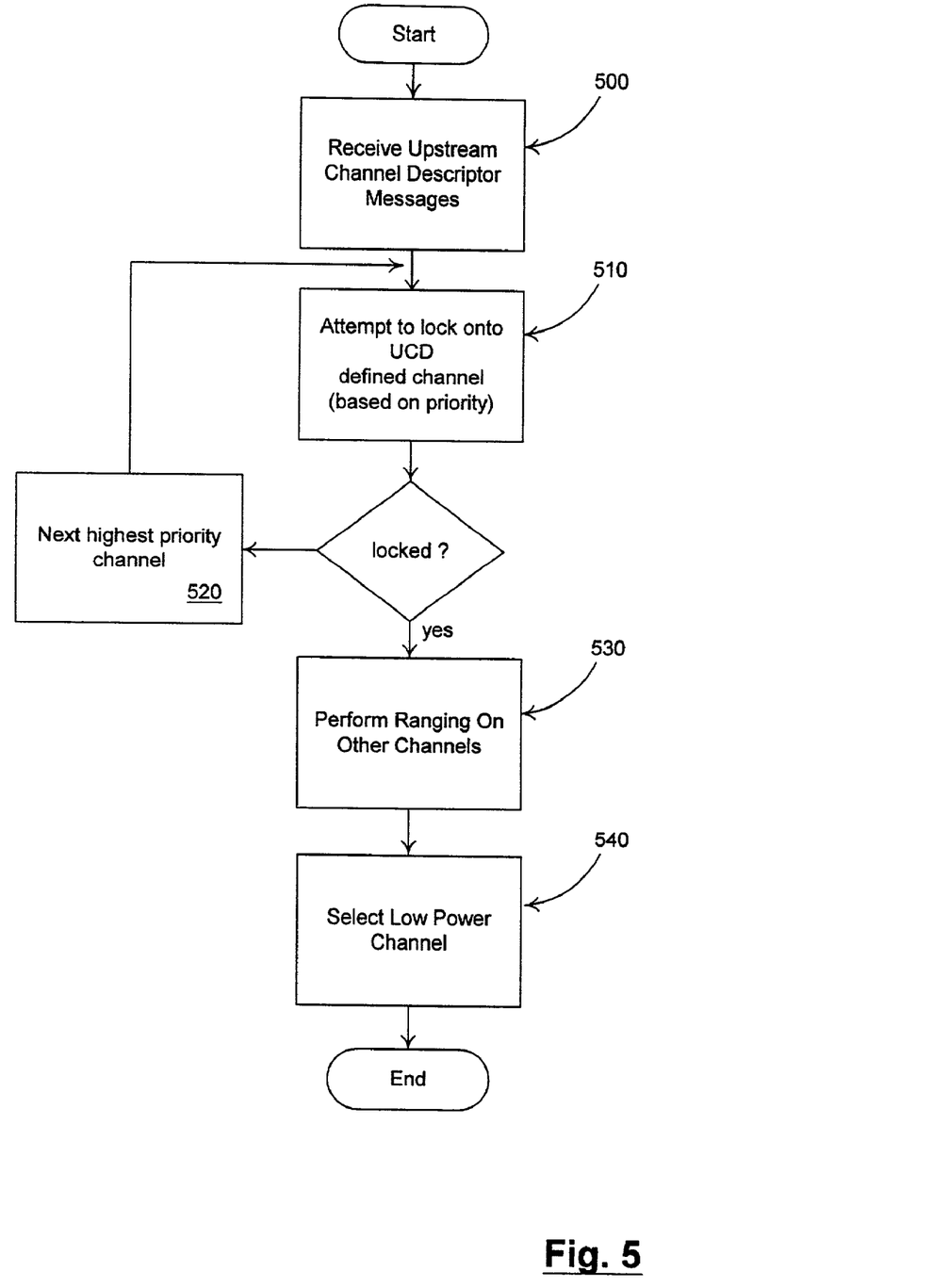
FIG. 5 is a flow chart illustrating acquisition of an upstream channel according to an embodiment of the present invention.

After acquiring a downstream channel, a CPE should acquire an upstream channel. The acquisition process is defined in DOCSIS, with the following changes:

The CPE should receive UCD messages for all the available upstream channels (see FIG. 5, step 500). This can be determined by the "number of channels" parameter in the UCD message.

The CPE should try the upstream channels according to the priorities for a new CPE (steps 510/520).

If the CPE has finished successfully ranging on an upstream channel, it should continue to test all the others upstream channels, if any, with the same priority (step 530). The one of these equal priority channels that requires the minimal transmitting power is selected (step 540).

The specific method of priorities allocation is depending on a specific vendor implementation. It is expected that channels that able to provide better service, based on modulation, symbol rate and current load will have higher priority. This way a CPE IDU will use the best channel it can use, choosing from channels with possibly different sectors, frequencies, and modulation scheme and symbol rate. Considering the current channels load when allocating priorities enables the BS IDU to balance the load between the channels.

Changing of an Upstream Channel

Changing of an upstream channel may be desired for improvement of initial selection, load balancing, because of system and channels changes.

It is expected that the BS should initiate such changes, using the DOCSIS UCC-REQ and UCC-RSP messages. Algorithms that use these features are left for BS vendor specific implementations.

While the embodiments, applications and advantages of the present invention have been depicted and described, there are many more embodiments, applications and advantages possible without deviating from the spirit of the inventive concepts described and depicted herein.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMs, micro-drive, and magneto-optical disks, ROMs, RAMS, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/ specialized computer or microprocessor are software modules for implementing the teachings of the present invention, including, but not limited to, preparing messages, scanning and acquisition of predefined channels, reading designation messages, interpreting channel priorities, changing channels, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by letters patent of the United States is:

1. A wireless communication system, comprising:
   a wireless hub configured to send downstream communications on at least one of a set of predefined downstream channels and receive upstream communications on at least one of a set of predefined upstream channels;
   at least one wireless modem configured to receive said downstream communications, and send said upstream communications;
   wherein said wireless modem comprises,
   an acquisition unit configured to acquire a predefined downstream channel transmitted by said hub and read Downstream Channel Descriptor (DCD) messages describing available downstream channels,
   a scanning unit configured to scan the available downstream channels, and
   a selection unit configured to select the best available downstream channel.

2. The system according to claim 1, wherein said wireless modem further comprises a channel quality unit configured to build a list of available downstream channels indicating a quality of reception on each channel.

3. A modem unit for use in a communication system, comprising:
   a reception unit configured to receive downstream communications on a current downstream channel; and
   a downstream channel selection unit configured to read Downstream Channel Descriptor (DCD) messages received by said reception unit and select a best available channel as said current downstream channel from priorities contained in said DCD messages.

4. The modem unit according to claim 3, further comprising:
  a transmission unit configured to transmit data from the modem unit on a current upstream channel; and
  an upstream channel selection unit configured to select the current upstream channel based on priorities of upstream channels in an Upstream Channel Descriptor (UDC) message received by said reception unit.

5. The modem unit according to claim 4, wherein said upstream channel selection unit and said downstream channel selection unit include a change channel mechanism configured to change either the current upstream channel or the current downstream channel based on the priorities contained in the respective UCD and DCD messages.

6. The modem, unit according to claim 5, wherein said upstream channel selection unit and said downstream channel selection unit use different priorities for selecting channels for initial communications and for changing the current upstream or downstream channel.

7. The modem unit according to claim 4, wherein said downstream channel selection unit selects the current downstream channel of a sector based on a highest amount of power of available channels, and said upstream channel selection unit selects the current upstream channel based on a same sector of the selected best available channel.

8. The modem unit according to claim 3, wherein said modem unit is pre-configured to use a particular cell or sector of a wireless hub to acquire and receive said downstream communications.

* * * * *